United States Patent
Abdallah et al.

(10) Patent No.: US 9,457,438 B2
(45) Date of Patent: Oct. 4, 2016

(54) FORCE-CONTROL ENABLED AUTOMATION OF TUBE-NUT ASSEMBLY APPLICATIONS

(71) Applicant: GM GLOBAL TECHNOLOGY OPERATIONS LLC, Detroit, MI (US)

(72) Inventors: Muhammad E. Abdallah, Rochester Hills, MI (US); Gary L. Villeneuve, Clarkston, MI (US); Sreten Zakula, Windsor (CA); Srinivas Chilpuri, Rochester, MI (US); Michael S. Cochran, Beavercreek, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 74 days.

(21) Appl. No.: 14/461,947

(22) Filed: Aug. 18, 2014

(65) Prior Publication Data

US 2015/0059175 A1 Mar. 5, 2015

Related U.S. Application Data

(60) Provisional application No. 61/871,682, filed on Aug. 29, 2013.

(51) Int. Cl.

| | | |
|---|---|---|
| *B23Q 5/00* | (2006.01) | |
| *B23P 19/06* | (2006.01) | |
| *B25B 23/14* | (2006.01) | |
| *B25J 13/08* | (2006.01) | |
| *B25J 15/00* | (2006.01) | |
| *B25B 13/48* | (2006.01) | |
| *B25B 21/00* | (2006.01) | |

(52) U.S. Cl.
CPC .............. *B23P 19/066* (2013.01); *B25B 13/48* (2013.01); *B25B 21/00* (2013.01); *B25B 23/14* (2013.01); *B25J 13/085* (2013.01); *B25J 15/0019* (2013.01); *G05B 2219/39319* (2013.01); *G05B 2219/45091* (2013.01); *Y10S 901/09* (2013.01); *Y10S 901/46* (2013.01); *Y10T 29/49231* (2015.01); *Y10T 29/49718* (2015.01); *Y10T 29/49766* (2015.01); *Y10T 29/49963* (2015.01)

(58) Field of Classification Search
CPC .. B23P 19/066; B25J 13/085; B25J 15/0019; B25B 13/48; B25B 21/00; B25B 23/14; Y10T 29/49718; Y10T 29/49766; Y10T 29/49963; Y10T 29/49231; G05B 2219/45091; G05B 2219/39319; Y10S 901/09; Y10S 901/46
See application file for complete search history.

(56) References Cited

U.S. PATENT DOCUMENTS

| | | | | |
|---|---|---|---|---|
| 4,798,111 | A * | 1/1989 | Cheeseman | B25B 13/56 81/124.4 |
| 5,775,303 | A * | 7/1998 | Sweetland | F02M 61/14 123/470 |
| 7,949,431 | B2 * | 5/2011 | Sato | B23P 19/12 700/245 |
| 8,796,582 | B2 * | 8/2014 | Kawai | B23K 26/046 219/121.6 |
| 2003/0080703 | A1 * | 5/2003 | Elliott | B25B 21/002 318/432 |
| 2009/0100972 | A1 * | 4/2009 | Hoenke | B25J 11/00 81/57.22 |
| 2009/0222222 | A1 * | 9/2009 | Lucke | G01L 25/003 702/41 |
| 2014/0151349 | A1 * | 6/2014 | Ma | B23K 9/09 219/137.2 |

* cited by examiner

*Primary Examiner* — David Bryant
*Assistant Examiner* — Jun Yoo
(74) *Attorney, Agent, or Firm* — John A. Miller; Miller IP Group, PLC

(57) ABSTRACT

A system and method for automating an assembly process of threading a tube-nut onto a threaded connector. The system includes a robot having a force sensor and a tube-nut runner tool coupled to the robot and having a tool head with a rotatable socket therein. The method includes engaging the socket to the tube-nut under force control using the force signal from the force sensor. The tool controller causes the socket to rotate the tube-nut where the tool controller controls the torque and/or angle displacement of the tool head to tighten the tube-nut on the threaded connector. The method also includes disengaging the tool head from the tube-nut after the tube-nut is properly tightened onto the threaded connector under force control to ensure that the end member is properly disengaged from the tube-nut.

26 Claims, 6 Drawing Sheets

FORCE-CONTROL ENABLED AUTOMATION OF TUBE-NUT ASSEMBLY APPLICATIONS

CROSS-REFERENCE TO RELATED APPLICATIONS

This application claims the benefit of the priority date of U.S. Provisional Patent Application Ser. No. 61/871,682, titled Force-Control Enabled Automation of Tube-Nut Assembly Applications, filed Aug. 29, 2013.

BACKGROUND OF THE INVENTION

1. Field of the Invention

This invention relates generally to a system and method for efficiently threading a tube-nut onto a threaded connector and, more particularly, to a system and method for threading a tube-nut associated with a high pressure fuel line in a diesel engine onto a threaded connector using an integrated control strategy that coordinates a robot employing force control and a tube-nut runner tool employing torque and angle control.

2. Discussion of the Related Art

Diesel engines, such as the 6.6 liter V-8 Duramax diesel engine, offer improvements in efficiency over similar sized conventional internal combustion engines. This efficiency is mainly due to employing compression-ignition that uses the heat of compression to initiate the ignition to burn the fuel injected into the engines combustion chambers instead of using spark-ignition employing a spark plug. Because a diesel engine uses compression for ignition, the fuel is provided to the fuel injectors at high pressure. Because the fuel is provided to the injectors at high pressure, the nuts and other fittings that couple the fuel line to a fuel rail and to the injector require high integrity sealing. Typically, the nut that attaches the fuel line to the threaded connector on the fuel rail is a tube-nut, where the tube-nut is attached to an end of the fuel line and is rotatable relative thereto, and where threading the tube-nut onto the threaded connector seals the end of the fuel line to the orifice in the fuel rail.

During assembly of a diesel engine of this type, an operator will often use a tube-nut runner to thread the tube-nut onto the threaded connector. A tube-nut runner is a power tool similar to a nut runner, but with an open-ended socket. The open end allows the socket to slip onto nuts with concentric tubes running through their center. Advanced nut-runners and tube-nut runners can have capabilities to control the torque and/or angle displacement of the socket. They can also feature capabilities of monitoring the angle and/or torque profiles to detect failure modes.

Because the operator is required to rotate the tube-nut onto the threaded connector with high torque, the assembly operation has high physical demands on the operator, especially the operator's arm joints, which limits the number of tube-nuts the operator can tighten during a particular time period. Further, because the fuel is delivered at high pressure requiring a high integrity seal provided by the tube-nut, a quality issue could arise because of the complicated nature of threading the tube-nut onto the threaded connector and the wear on the operator. Further, because of the torque requirements on the tube-nut for tightening purposes, even after the tube-nut is tight using the tube-nut runner, one and possibly two more tube-nut tightening steps are often employed using a manual torque wrench to ensure that the tube-nut is properly tightened on the threaded connector, thus increasing the cost of assembly of the engine.

SUMMARY OF THE INVENTION

In accordance with the teachings of the present invention, a system and method are disclosed for automating an assembly process of threading a tube-nut onto a threaded connector that has particular operation for threading a tube-nut associated with a high pressure fuel line in a diesel engine. The system includes a robot having a force sensor and a robot controller, where the robot controller receives a force signal from the force sensor. The system also includes a tube-nut runner tool coupled to the robot and including a tool controller and a tool head having a socket rotatable therein. The socket can be open to a bottom of the tool head or the socket can include a top socket portion open to a top of the tool head and a bottom socket portion open to a bottom of the tool head, where the top and bottom socket portions are separated by a ridge. The method includes engaging the socket to the tube-nut under force control using the force signal from the force sensor. The tool controller then causes the socket to rotate the tube-nut, where the tool controller controls the torque and/or angle displacement of the socket to tighten the tube-nut on the threaded connector. The method also includes disengaging the tool head from the tube-nut after the tube-nut is properly tightened onto the threaded connector under force control to ensure that the tool head is properly disengaged from the tube-nut. A main controller receives signals from and provides commands to the robot controller and the tool controller to provide an integrated control strategy for coordination between the robot and the tube-nut runner tool that allows the robot to engage the tube-nut runner tool on the tube-nut, tighten the tube-nut on the threaded connector and disengage the tube-nut runner tool from the tube-nut.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for automating the assembly of threading a tube-nut to a threaded connector is merely exemplary in nature, and is in no way intended to limit the invention or its applications or uses. Particularly, the system and method have particular application for threading tube-nuts associated with a high pressure fuel line to a threaded connector in a diesel engine. However, as will be appreciated by those skilled in the art, the system and method of the invention may have other applications.

Figure 1:
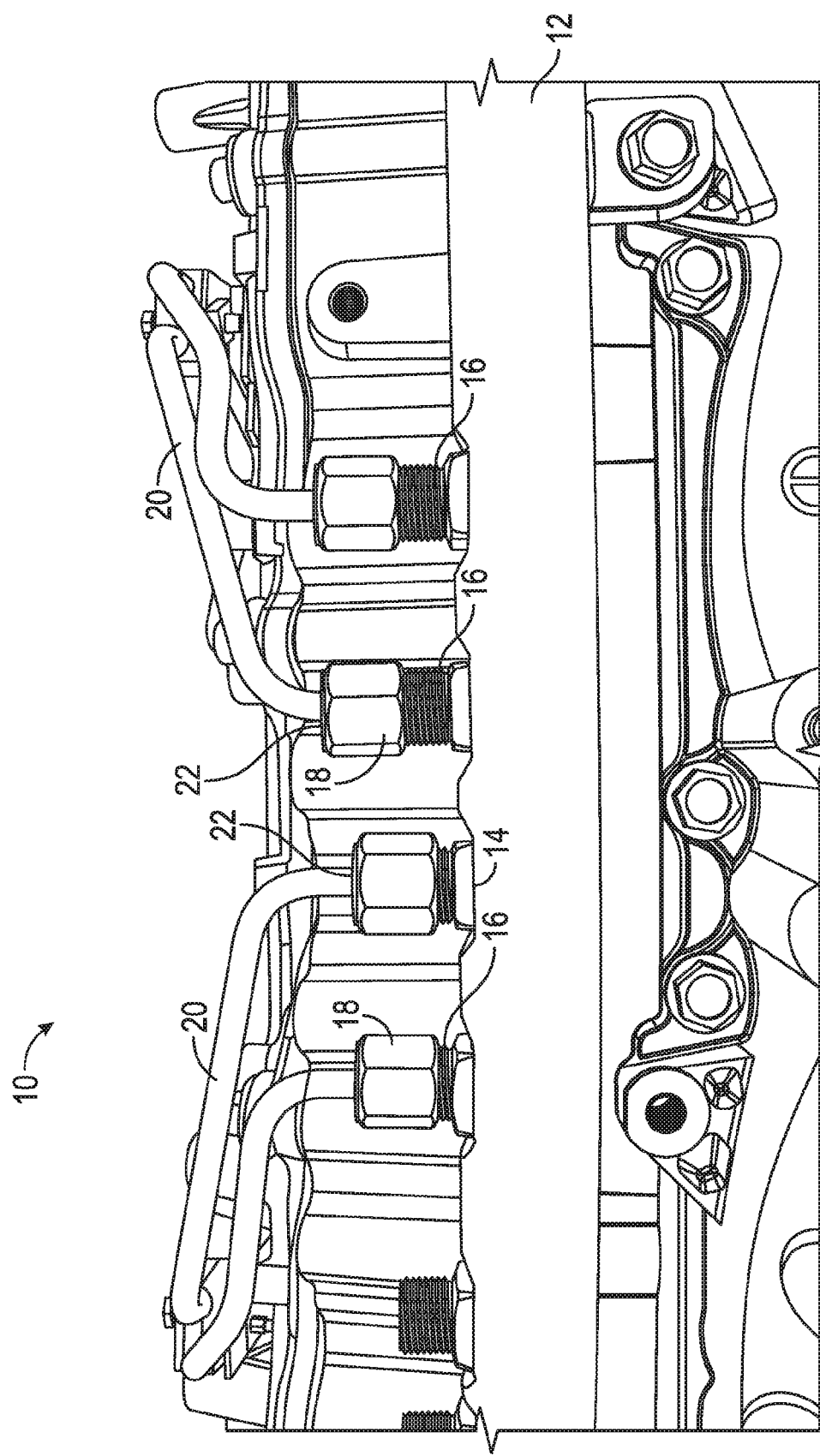
FIG. 1 is a cut-away, front view of a diesel engine showing fuel lines being coupled to a fuel rail.

FIG. 1 is a cut-away, front view of a diesel engine 10, such as the 6.6 liter V-8 Duramax diesel engine. The engine 10 includes a fuel rail 12 that provides diesel fuel at high pressure from a fuel pump (not shown). The fuel rail 12 includes spaced apart orifices 14 each having a threaded connector 16 welded thereto. A tube-nut 18 is threaded to each of the connectors 16, where the tube-nuts 18 on the left side are completely threaded onto the threaded connectors 16 and the tube-nuts 18 on the right side are partially threaded onto the threaded connectors 16. A fuel tube 20 extends through a top opening 22 in each of the tube-nuts 18, where the tube-nut 18 is rotatable relative to the fuel tube 20 in a manner well understood by those skilled in the art. An opposite end (not shown) of each of the fuel tubes 20 would be connected to another tube-nut (not shown) associated with a threaded connector (not shown) on an injector (not shown) that injects the fuel into the associated cylinder or combustion chamber in a manner well understood by those skilled in the art. Also well understood by those skilled in the art is how the end of the fuel tube 20 is sealed to both a top end of the threaded connector 16 and an underside of the tube-nut 18 at the opening 22 that allows high pressure fuel to flow through the threaded connector 16 and into the fuel tube 20 when the tube-nut 18 is threaded onto the threaded connector 16.

As will be discussed in detail below, the present invention proposes an automated operation using a robot and tube-nut runner tool for properly securing the tube-nuts 18 to the threaded connectors 16, where the robot employs force control and the tube-nut runner tool employs torque and angle control. A main controller employs a control algorithm that provides an integrated control strategy between the force control of the robot and the torque and angle control of the tube-nut runner tool so that the force detected by the robot between the tube-nut runner tool and the tube-nut 18 is provided in combination with the torque and angle control provided by the tube-nut runner tool. For one particular control algorithm, the robot is able to cause the tube-nut runner tool to tighten several of the tube-nuts 18 in under a minute, where a particular assembly station may be employed for a predetermined number of tube-nuts.

Figure 2:
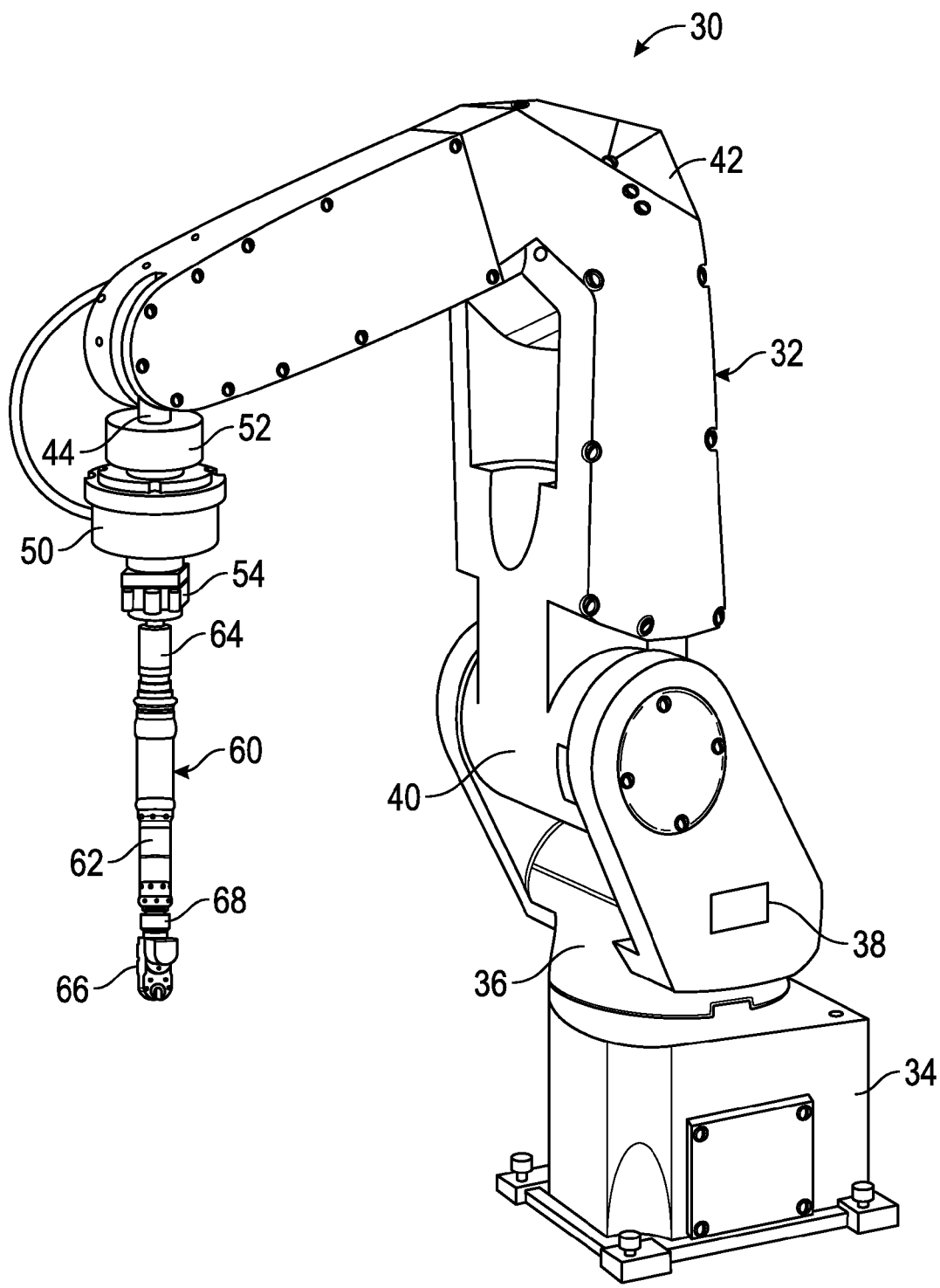
FIG. 2 is a perspective view of a robot including a force sensor and a tube-nut runner tool attached thereto.

FIG. 2 is a perspective view of a robot 30 including a segmented robot arm 32 mounted to a base 34 at a rotatable joint 36 that allows the arm 32 to rotate relative to the base 34. The segmented arm 32 includes joints 40, 42 and 44 that allow the robot 30 to be positioned at any suitable location in a manner well understood by those skilled in the art. A force sensor 50 is mounted to an end member 52 of the robot arm 32 and an end effector 54 is mounted to the force sensor 50 opposite to the end member 52 and is configured to hold a tube-nut runner tool 60. The robot 30 also includes a robot controller 38 operating a robot control algorithm for operation of the robot 30 that receives a force signal from the force sensor 50 to provide force control consistent with the discussion herein. In an alternate embodiment, the robot 30 includes an inherent force control capability through internal force sensing or implicit force control, for example, current control, where the force sensor 50 would not be required. In this embodiment, the robot controller 38 is shown internal to the robot 30. However, as will be appreciated by those skilled in the art, the robot controller 38 may be external to the robot 30 provided at some suitable location. Further, a main controller 46 is shown in communication with the robot controller 38 and the tube-nut runner tool 60 and employs a main control algorithm that receives signals from and provides commands to the robot controller 38 and the tube-nut runner tool 60 for an integrated control strategy that allows the robot 30 and the tube-nut runner tool 60 to effectively tighten a series of the tube-nuts 18 onto the threaded connector 16 consistent with the discussion herein. The main controller 46 can be any programmable logic controller (PLC), programmable controller (PC), personal computer, etc. suitable for the purposes described herein, and can be part of the robot controller 38. The robot 30 is intended to represent any known robot including a force sensor or inherent force controls suitable for the purpose discussed herein.

Figure 3:
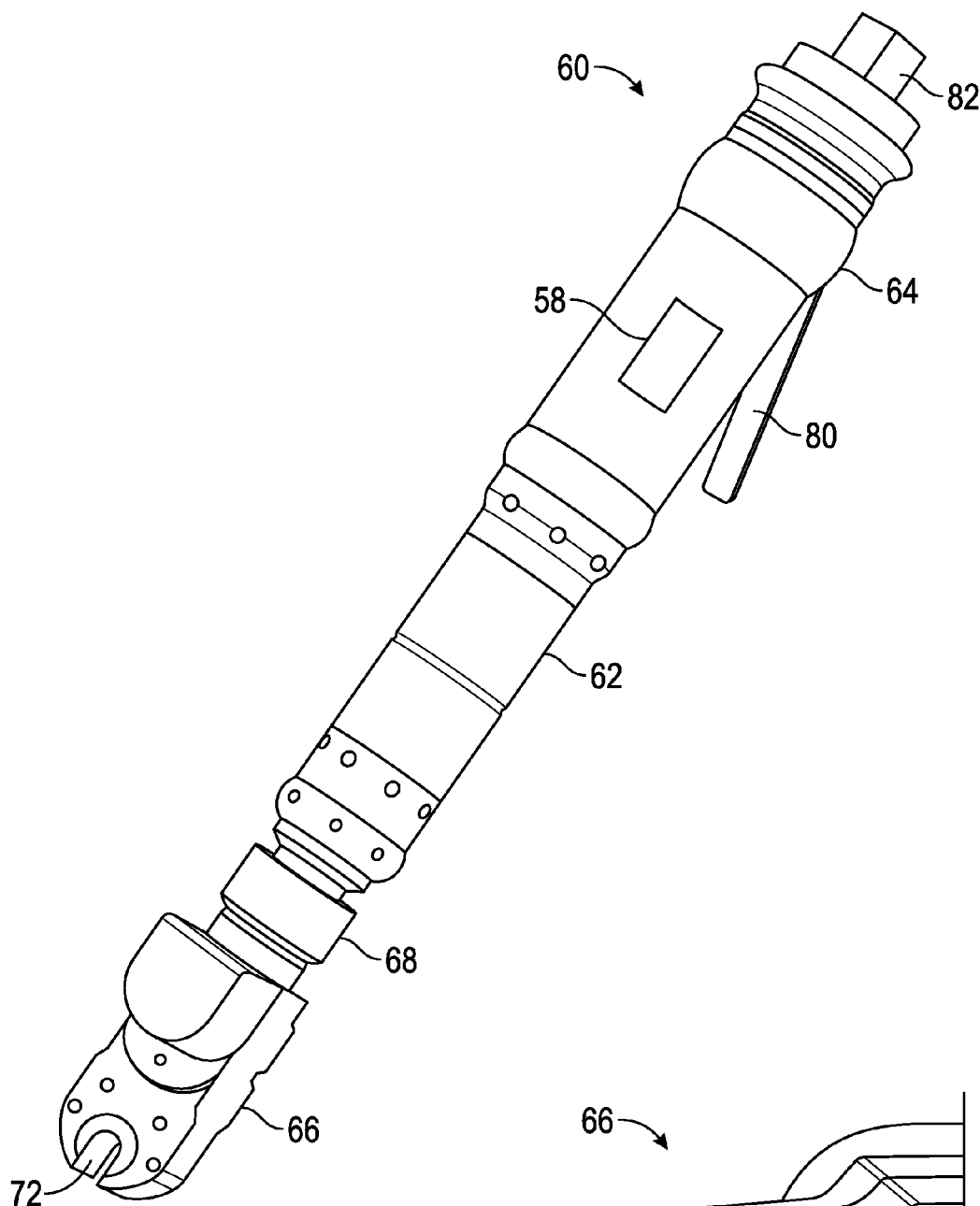
FIG. 3 is a perspective view of the tube-nut runner tool separated from the robot.

FIG. 3 is a perspective view of the tube-nut runner tool 60 separated from the robot 30. The tube-nut runner tool 60 includes a handle portion 62 having a control end 64 and a ratchet tool head 66. The tool head 66 is mounted to the handle portion 62 by a joint 68 that allows the tool head 66 to be pivotally positioned relative to the handle portion 62. The tube-nut runner tool 60 includes a tool controller 58 that provides torque and angle control consistent with the discussion herein. Although the tool controller 58 is shown internal to the tube-nut runner tool 60 in this non-limiting embodiment, other embodiments may provide the tool controller 58 external to the tube-nut runner tool 60 at any suitable location. Further, the main controller 46 is in communication with the tool controller 58. Tube-nut runner tools of this type are well known to those skilled in the art and the tube-nut runner tool 60 is intended to represent any tube-nut runner tool including both torque control and angle control suitable for the purposes discussed herein.

Figure 4:
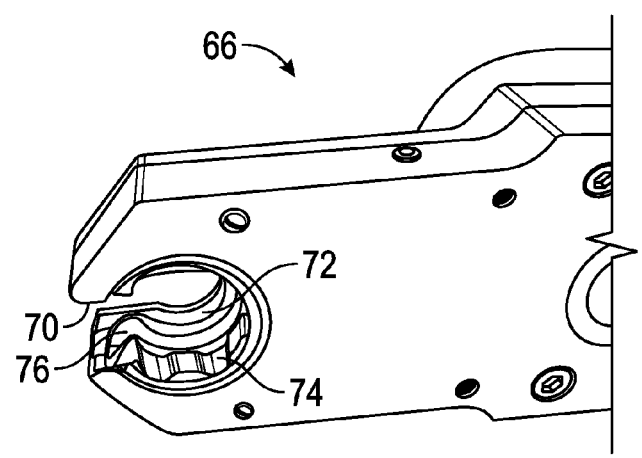
FIG. 4 is an underside view of a tool head of the tube-nut runner tool.

FIG. 4 is a cut-away, perspective view of an underside of the tool head 66 of the tube-nut runner tool 60. The tool head 66 includes an opening 70 in communication with a cylindrical bore 72 extending through the tool head 66. A socket 74 is rotatably mounted within the bore 72 through suitable gears (not shown) and is sized to mate with the tube-nut 18. The socket 74 includes a slot 76 that when aligned with the opening 70 allows the fuel tube 20 to be slid onto the tool head 66 so that it extends through the bore 72. In this embodiment, the tube-nut 18 is only accessible to the socket 74 through a bottom of the tool head 66. In an alternate embodiment, the tube-nut 18 may be only accessible to the socket 74 through a top of the tool head 66. The tube-nut runner tool 60 can be activated manually through a lever 80 or electronically by a signal from the controller 58. The socket 74 is rotated within the tool head 66 according to the control parameters set in the controller 58. Once the tube-nut 18 is completely threaded onto the threaded connector 16 with the proper torque, a signal is sent to the tool controller 58, either by the lever 80 or the main controller 46, to cause the slot 76 to align with the opening 70 in a home position so that the tube-nut runner tool 60 can be removed from the fuel line 20.

Figure 5:
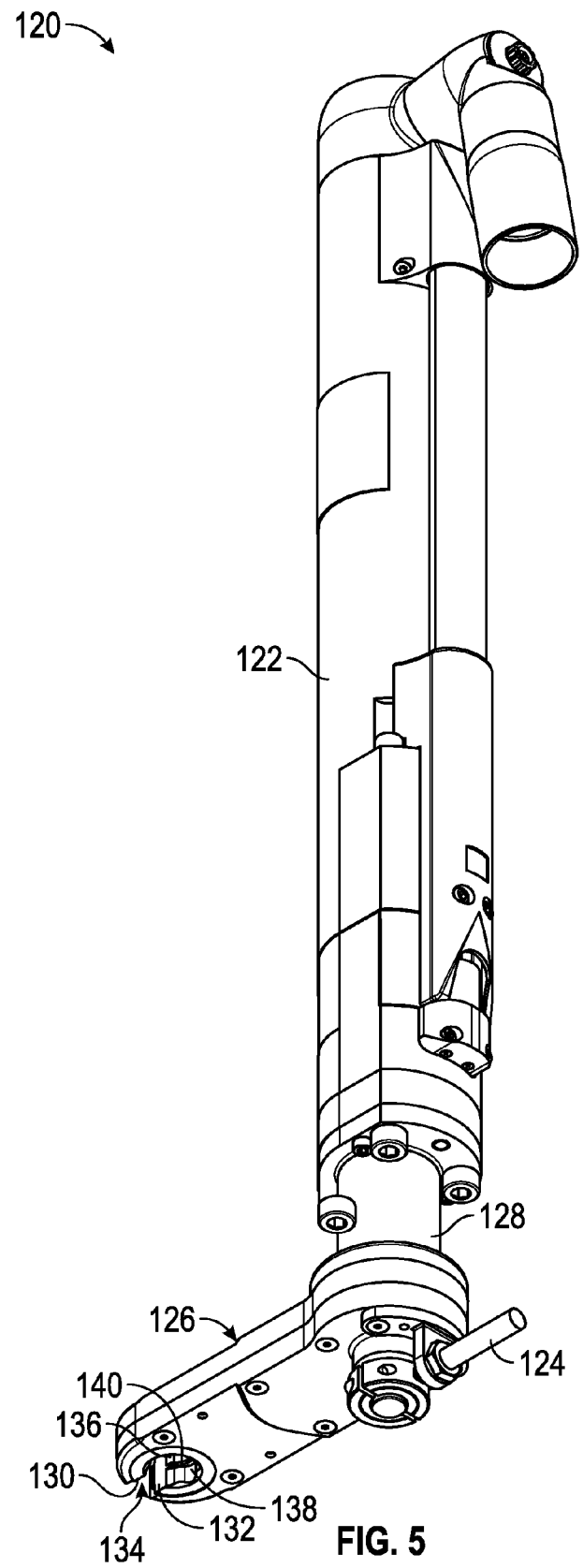
FIG. 5 is a perspective view of another tube-nut runner tool including a socket having top and bottom socket portions.
Figure 6:
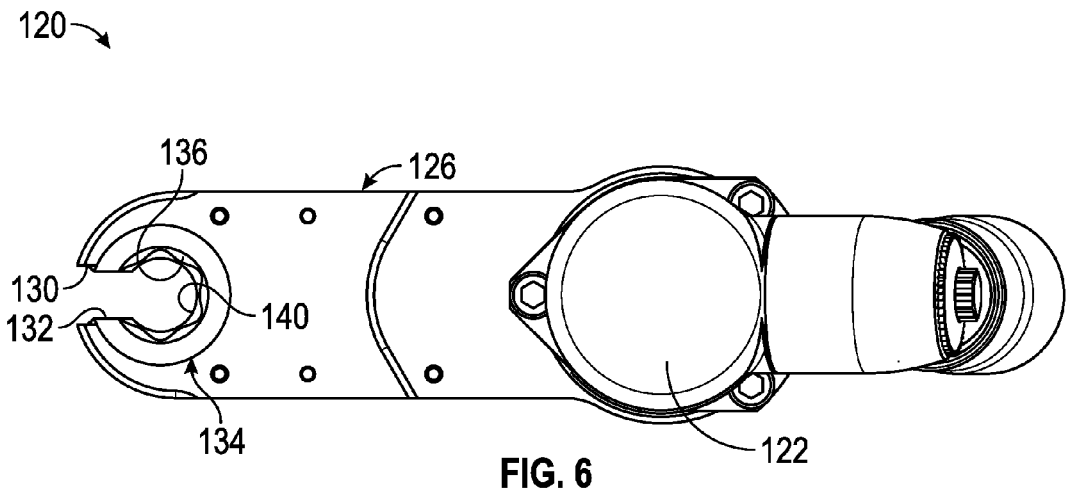
FIG. 6 is a top view of the tube-nut runner tool shown in FIG. 5.
Figure 7:
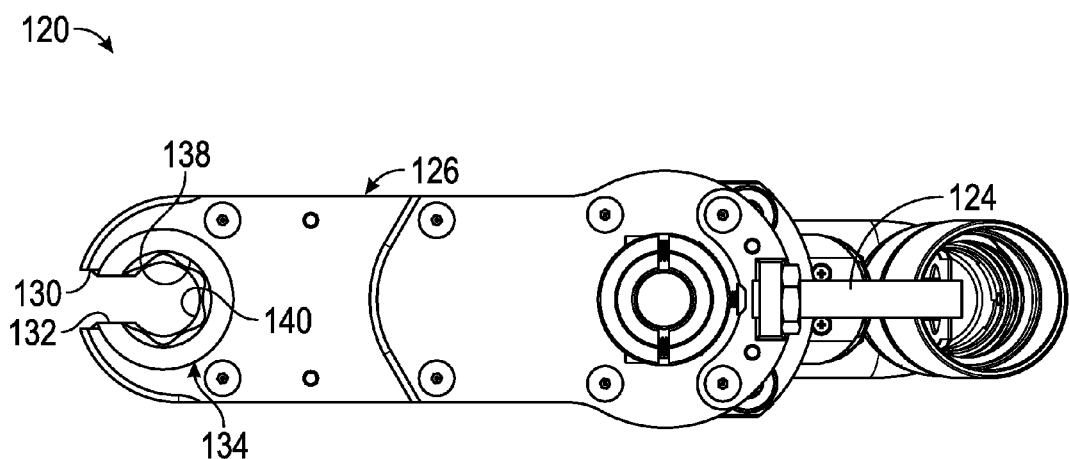
FIG. 7 is a bottom view of the tube-nut runner tool shown in FIG. 5.

FIG. 5 is a perspective view, FIG. 6 is a top view and FIG. 7 is a bottom view of another tube-nut runner tool 120 that is similar to the tube-nut runner tool 60 and includes the same control functions as discussed herein to be operated in conjunction with the robot 30. The tube-nut runner tool 120 includes a spindle 122 and a ratchet tool head 126 that is mounted to the spindle 122 by a joint 128, where a proximity switch 124 extends from the tool head 126. The tool head 126 includes an opening 130 in communication with a cylindrical bore 132 extending through the tool head 126. In contrast to the tube-nut runner tool 60, the tool head 126 includes a socket 134 having a top socket portion 136 that is open to the top of the tool head 126 and a bottom socket portion 138 that is open to the bottom of the tool head 126, where the tool head 126 can rotate the socket 134 in either the clockwise or counter-clockwise direction. The socket portions 136 and 138 are separated by a ridge 140 located at a center plane of the tool head 126. During operation of the tube-nut runner tool 120, the ridge 140 is pressed down on the tube-nut 18 either from the top or bottom of the tool head 126, where the tool head 126 rotates the socket 134 in the proper direction depending on which socket portion 136 or 138 is being used. The socket portions 136 and 138 can have different sizes for different sized tube-nuts or the socket portions 136 and 138 can be the same size, which provides flexibility of not needing to flip the robot 30 to access certain tube-nuts. Thus, the tube-nut runner tool 120 can be employed in a controlled manner as discussed herein to tighten tube-nuts of different sizes, where the tool head 126 would be properly positioned for either the socket portion 136 or the socket portion 138 depending on the size of the tube-nut 18.

Figure 8:
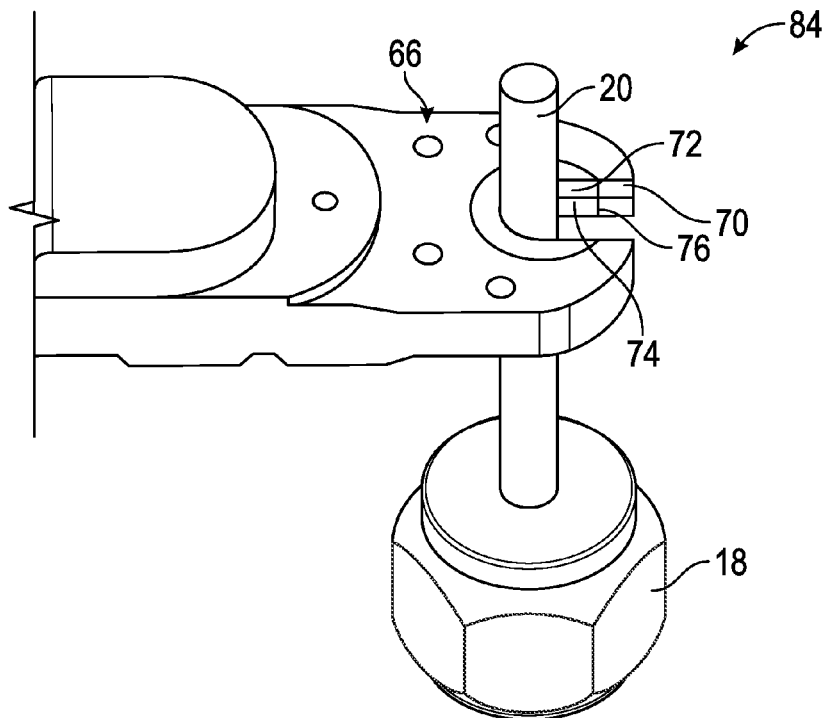
FIG. 8 is a cut-away view of the end piece of the tube-nut runner tool positioned relative to a tube-nut.

FIG. 8 is an illustration 84 showing the tool head 66 of the tube-nut runner tool 60, where the fuel tube 20 is positioned in the bore 72 and the socket 74 is positioned directly above the tube-nut 18. It is noted that the tool head 66 can be replaced with the tool head 126, where the tool head 126 would be properly oriented for either the socket portion 136 or the socket portion 138. The control algorithm operating the robot 30 positions the tube-nut runner tool 60 at this location for starting the sequence for tightening the tube-nut 18 on the threaded connector 16. When in this position, the tube-nut 18 will be partially threaded onto the threaded connector 16 from a previous manual operation, but the robot controller 38 will not know how far down on the threaded connector 16 the tube-nut 18 has been threaded. Because the robot controller 38 does not know the height of the tube-nut 18 on the threaded connector 16, the robot controller 38 employs the force signal from the force sensor 50 to cause the robot 30 to position the tube-nut runner tool 60 to apply a desired amount of force of the tool head 66 on the tube-nut 18 to ensure that the tube-nut 18 will be properly threaded onto the threaded connector 16. The tube-nut runner tool 60 is positioned and the force control provided by the robot 30 onto the tube-nut 18 also allows the socket 74 to be aligned with the tube-nut 18, where the robot 30 rotates the tool head 66 under the force control until the tube-nut 18 is properly mounted within the socket 74.

Once the tube-nut runner tool 60 is properly positioned on the tube-nut 18, the robot controller 38 provides a signal to the main controller 46 indicating that the tube-nut 18 is ready to be tightened. The main controller 46 then provides a signal to the tool controller 58 that causes the tool controller 58 to rotate the socket 74 within the tool head 66 through the gears to tighten the tube-nut 18 on the threaded connector 16 using torque and position control. Controlling the rotation of the socket 74 may be a combination of detecting the torque applied to the tube-nut 18 during the ratcheting process and/or monitoring the angle of rotation of the socket 74 during the tightening process using the tool controller 58 at the same time that the robot controller 38 monitors the force of the socket 74 on the tube-nut 18. For example, the control process may rotate the tube-nut 18 until a certain amount of Newton meters of torque is achieved, for example, 10 Newton meters, and then the control process may turn the socket 74 30° from that point to provide the final desired torque position of the tube-nut 18.

During the tightening process, the tool controller 58 monitors for fault conditions where the tube-nut 18 may not be properly threaded onto the threaded connector 18. For example, a spike in the torque on the socket 74 could indicate that the tube-nut 18 is cross-threaded onto the threaded connector 16. Since the controller 58 will know the position of the socket 74, a high degree of torque at a location where the controller 58 knows that the tube-nut 18 is not tightened properly onto the threaded connector 16 would be an indication of a fault. Also, if the tube-nut runner tool 60 fails to properly engage the tube-nut 18, the controller 58 can determine the direction the tool head 66 needs to be moved for proper engagement by the moments seen by the force sensor 50, where the tube-nut runner tool 60 is commanded to move the tool head 66 in that direction.

Once the tube-nut 18 is properly tightened onto the threaded connector 16, the control algorithm then performs a tube-nut dismounting operation, where the tool head 66 is first lifted off of the tube-nut 18 to some clearance, and where the fuel tube 20 is still positioned within the bore 72. The socket 74 is then rotated to the home position so that the slot 76 in the socket 74 is aligned with the opening 70 in the tool head 66 to allow the tool head 66 to be slid off of the tube 20. During the dismounting step, the controller 38 is using the force signal from the force sensor 50 to watch for faults that could occur to prevent damage to the fuel tube 20. For example, if the tool head 66 has not properly cleared of the tube-nut 18, but the control algorithm thinks that it has positioned the tool head 66 with the proper clearance, and attempts to move the tube-nut runner tool 60, the force sensor 50 will sense the force occurring as a result of the tool head 66 not being clear of the tube-nut 18, and will provide a fault stopping the process. Additionally, if the tool head 66 has cleared the tube-nut 18, but the slot 76 in the socket 74 is not aligned with the opening 70 in the tool head 66, where the control algorithm thinks that it has, moving the tool head 66 causes the tube 20 to contact the socket 74, which can be detected by the force sensor 50. In this manner, the force sensor 50 can monitor the dismounting step without the need for additional sensors to detect these faults.

Figure 9:
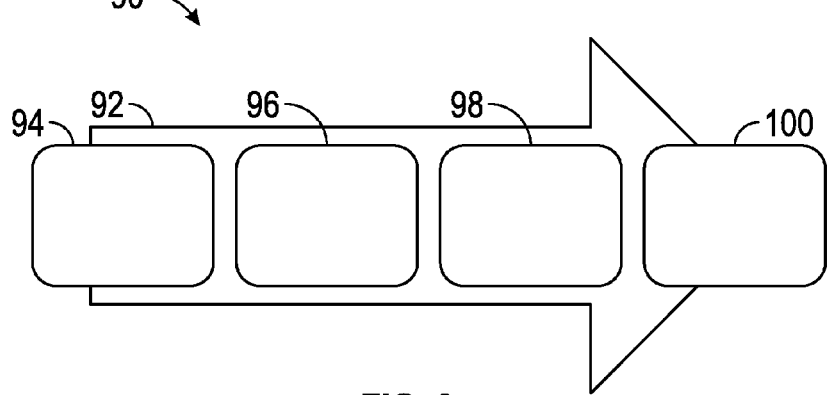
FIG. 9 is a flow diagram showing an integrated control strategy between a robot controller and a tube-nut runner tool controller.

FIG. 9 is a flow diagram 90 showing the integrated control strategy operating in the main controller 46 between the robot controller 38 and the tool controller 58 as discussed herein. It is noted that this discussion also applies to the tube-nut runner tool 120. Arrow 92 represents the force control used by the robot controller 38 when the tool head 66 engages the tube-nut 18 discussed above. Boxes 94, 96, 98 and 100 represent the sequence of steps controlling the torque and angle position of the socket 74 provided by the tool controller 58 when the tube-nut 18 is being tightened onto the threaded connector 16. As is apparent, the robot controller 38 is always monitoring the force of the tool head 66 on the tube-nut 18 during the entire operation. The tool head 66 engages the tube-nut 18 and the socket 74 is locked to the tool head 66 and is rotated to position the tube-nut 18 onto the threaded connector 16 at the box 94. The socket 74 at box 96 is rotated in reverse to some predetermined angle. The tube-nut 18 is then tightened at the box 98 to provide the final position of the tube-nut 18 on the threaded connector 16 where the controller 58 uses both torque and angle position to determine this position. The box 100 provides the same control input as the box 96. Another sequence of control steps is engaged for the dismount of the tool 60, where the robot 30 lifts the tool 60 off of the tube-nut 18, while monitoring the forces, the tool 60 opens the socket 74 to the home position, and the robot 30 pulls the tool 60 off of the tube 20.

The tube-nut runner tools 60 and 120 require periodic maintenance for efficient operation. As discussed below, maintenance is provided on the tube-nut runner tool 60 in an automated process at periodic intervals, such as after so many tightening cycles with the understanding that the same or similar maintenance operations would be provided for the tube-nut runner tool 120.

Figure 10:
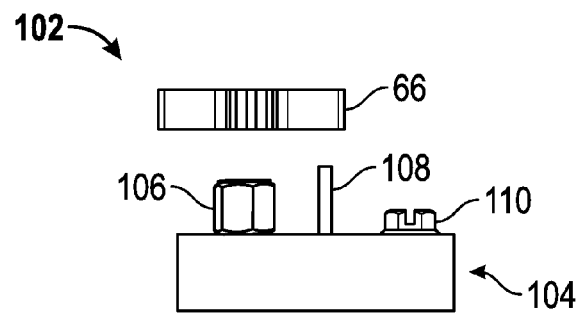
FIG. 10 is an illustration showing the tube-nut runner tool at a maintenance station that provides torque recalibration, position sensing recalibration and tube-nut runner tool lubrication.

FIG. 10 is an illustration 102 showing the tool head 66 being positioned by the robot 30 at a maintenance station 104, where the maintenance station 104 would be in communication with the main controller 46 to provide the maintenance operation, and where the tool 120 would receive maintenance in the same manner. The maintenance station 104 would perform three operations, namely, recalibrating the torque detection or sensing by the tool controller 58, recalibrating the home position sensing of the socket 74 by the tool controller 58, and lubricating the gears and other movable elements within the tool head 66. For example, after continued and prolonged use, the position of the socket 74 may not be at the proper angular position where the slot 76 is aligned with the opening 70, but the controller 58 may think that the angle position of the socket 74 is at the home position. The socket 74 would thus need to be calibrated to the home position, where the slot 76 is aligned with the opening 70 for effective use.

The maintenance station 104 includes a fixture 106, such as a replica of the tube-nut 18, where the fixture 106 is fixed and cannot be rotated. The socket 74 is placed on the fixture 106 and is given a rotation command, where the torque on the fixture 106 is measured to provide a known amount of torque for a given torque command by the tool controller 58. For the tube-nut runner tool 120, the maintenance station 104 would include a separate torque calibration fixture for both of the socket portions 136 and 138. The maintenance station 104 also includes a fixture 108 that is slid into the bore 72 when the socket 74 is in the home position to ensure that the slot 76 is aligned with the opening 72 in a positioning calibration process. The maintenance station 104 also includes a fixture 110 that provides lubricating grease to the proper location within the tool head 66 when the tool head 66 is placed on the fixture 110 by the robot 30 so that lubrication is provided to the gears and other movable parts within the tool head 66.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for threading a tube-nut onto a threaded connector, said method comprising:
providing a robot including a force sensor and a robot controller, said robot controller receiving a force signal from the force sensor;
providing a tube-nut runner tool coupled to the robot, said tube-nut runner tool including a tool controller and a tool head having a socket rotatable therein;
engaging the socket to the tube-nut under force control provided by the robot controller using the force signal from the force sensor;
rotating the tube-nut using the socket under control by the tool controller, said tool controller controlling the torque on the socket and/or an angle position of the socket to tighten the tube-nut on the threaded connector; and
disengaging the tool head from the tube-nut after the tube-nut is properly tightened onto the threaded connector under force control or force monitoring provided by the robot controller to ensure that the tool head is properly disengaged from the tube-nut.

2. The method according to claim 1 wherein the socket is able to engage the tube-nut from only a top or bottom of the tool head.

3. The method according to claim 1 wherein the socket includes a top socket portion and a bottom socket portion separated by a ridge, where the top socket portion is open to a top of the tool head and the bottom socket portion is open to a bottom of the tool head, said tool head operable to rotate the socket in opposite directions.

4. The method according to claim 3 wherein the first and second socket portions have the same size or are different sizes to accommodate different size tube-nuts.

5. The method according to claim 1 wherein the tube-nut is associated with a tube, and wherein engaging the at least one socket to the tube-nut includes first sliding the tube into a bore extending through the socket and the tool head.

6. The method according to claim 5 wherein the tube is a fuel tube.

7. The method according to claim 6 wherein the fuel tube is part of a diesel engine.

8. The method according to claim 1 wherein rotating the tube-nut using the socket includes monitoring for faults to ensure that the tube-nut is being properly threaded onto the threaded connector.

9. The method according to claim 8 wherein monitoring for faults includes monitoring for spikes in torque using the tool controller that may indicate that the tube-nut is cross-threaded onto the threaded connector.

10. The method according to claim 1 further comprising determining if the tube-nut runner tool fails to properly engage the tube-nut and, if so, determining the direction the tool head needs to be moved to engage the tube-nut and moving the tool head in that direction, where the direction is determined by moments seen by the force sensor.

11. The method according to claim 1 wherein disengaging the tool head from the tube-nut includes using the force signal to determine that the tool head has cleared the tube-nut.

12. The method according to claim 1 wherein a main controller provides control commands to the robot controller and the tool controller to coordinate the operation between the robot and the tube-nut runner tool.

13. The method according to claim 12 wherein controlling the coordination between the robot and the tube-nut runner tool includes providing an integrated control strategy between the tool controller rotating the socket under torque and/or angle displacement control and the robot controller controlling the force and/or position of the tube-nut runner tool.

14. The method according to claim 1 further comprising providing maintenance of the tube-nut runner tool in an automated process where the robot provides the tube-nut runner tool to the maintenance station at a predetermined time.

15. The method according to claim 14 wherein providing maintenance includes providing torque calibration of the socket, providing position calibration of the socket and providing lubrication of the tool head.

16. The method according to claim 15 wherein the socket includes a top socket portion and a bottom socket portion separated by a ridge, where the top socket portion is open to a top of the tool head and the bottom socket portion is open to a bottom of the tool head, and wherein providing maintenance includes providing torque calibration for the first and second socket portions.

17. A method for threading a tube-nut associated with a high pressure fuel line in a diesel engine onto a threaded connector associated with a fuel rail in the engine, said method comprising:
   providing a robot including a force sensor and a robot controller, said robot controller receiving a force signal from the force sensor;
   providing a tube-nut runner tool coupled to the robot and including a tool controller, said tube-nut runner tool also including an a tool head and a socket rotatable therein;
   providing a main controller that provides integrated control commands to the robot controller and the tool controller to coordinate the operation between the robot and the tube-nut runner tool;
   positioning the tool head above the tube-nut so that the fuel line extends through a bore in the tool head and the socket;
   engaging the socket to the tube-nut under force control provided by the robot controller using the force signal from the force sensor;
   rotating the tube-nut using the socket under control by the tool controller, said tool controller controlling torque on the tube-nut runner tool and an angle position of the socket to tighten the tube-nut on the threaded connector; and
   disengaging the tool head from the tube-nut after the tube-nut is properly tightened onto the threaded connector under force control to ensure that the tool head is properly disengaged from the tube-nut, wherein controlling the coordination between the robot and the tube-nut runner tool includes providing an integrated control strategy between the tool controller rotating the socket under torque and/or angle displacement and the robot controller controlling the force and/or position of the tube-nut runner tool.

18. The method according to claim 17 wherein the socket is able to engage the tube-nut from only a top or bottom of the tool head.

19. The method according to claim 17 wherein the socket includes a top socket portion and a bottom socket portion separated by a ridge, where the top socket portion is open to a top of the tool head and the bottom socket portion is open to a bottom of the tool head, said tool head operable to rotate the socket in opposite directions.

20. The method according to claim 17 wherein rotating the socket includes monitoring for faults to ensure that the tube-nut is being properly threaded onto the threaded connector.

21. The method according to claim 17 wherein monitoring for faults includes monitoring for spikes in torque using the tool controller that may indicate that the tube-nut is cross-threaded onto the threaded connector.

22. The method according to claim 17 wherein disengaging the tool head from the tube-nut includes using the force signal to determine that the tool head has cleared the tube-nut.

23. A system for threading a tube-nut onto a threaded connector, said system comprising:
   a robot including a force sensor and a robot controller, said robot controller receiving a force signal from the force sensor; and
   a tube-nut runner tool coupled to the robot, said tube-nut runner tool including a tool controller and a tool head having a socket rotatable therein, said robot controller causing the socket to engage the tube-nut under force control using the force signal from the force sensor, and wherein the tool controller controls the torque on the tube-nut runner tool and an angle position of the socket to tighten the tube-nut on the threaded connector, and where the robot controller subsequently disengages the tool head from the tube-nut under force control or force monitoring to ensure that the tool head is properly disengaged from the tube-nut.

24. The system according to claim 23 wherein the socket is able to engage the tube-nut from only a top or bottom of the tool head.

25. The system according to claim 23 wherein the socket includes a top socket portion and a bottom socket portion separated by a ridge, where the top socket portion is open to a top of the tool head and the bottom socket portion is open to a bottom of the tool head, said tool head operable to rotate the socket in opposite directions.

26. The system according to claim 23 further comprising a main controller that provides control commands to the robot controller and the tool controller to coordinate the operation between the robot and the tube-nut runner tool.

* * * * *